(12) United States Patent
Lee et al.

(10) Patent No.: US 11,255,234 B2
(45) Date of Patent: Feb. 22, 2022

(54) DEVICE FOR CONTROLLING PRESSURE OF OIL PUMP IN VEHICLE

(71) Applicants: Hyundai Motor Company, Seoul (KR); Kia Motors Corporation, Seoul (KR)

(72) Inventors: Min Yong Lee, Incheon (KR); Seong Sik Kim, Gyeonggi-do (KR); Jun Sik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/695,924

(22) Filed: Nov. 26, 2019

(65) Prior Publication Data

US 2021/0003049 A1 Jan. 7, 2021

(30) Foreign Application Priority Data

Jul. 2, 2019 (KR) .......................... 10-2019-0079373

(51) Int. Cl.
| | |
|---|---|
| *F01M 1/16* | (2006.01) |
| *B60W 40/076* | (2012.01) |
| *F01M 1/20* | (2006.01) |
| *B60R 16/023* | (2006.01) |
| *F02B 39/14* | (2006.01) |

(52) U.S. Cl.
CPC ............ *F01M 1/16* (2013.01); *B60W 40/076* (2013.01); *F01M 1/20* (2013.01); *B60R 16/0233* (2013.01); *F02B 39/14* (2013.01)

(58) Field of Classification Search
CPC ......... F01M 1/16; F01M 1/20; B60W 40/076; B60G 2800/016; F02B 39/14; F02B 2039/162; B60R 16/0233; B62D 33/073; B62D 33/067
USPC .................. 123/196 CP, 196 R; 180/282, 328
See application file for complete search history.

(56) References Cited

U.S. PATENT DOCUMENTS

| | | | |
|---|---|---|---|
| 2006/0151225 A1* | 7/2006 | Tsujii ..................... | B62K 11/06 180/209 |
| 2010/0152971 A1* | 6/2010 | Shiino ..................... | B62D 5/09 701/41 |
| 2013/0192558 A1* | 8/2013 | Hodges ................ | F01M 11/064 123/196 R |
| 2013/0251541 A1* | 9/2013 | Okamoto ................ | F04B 49/06 417/32 |

* cited by examiner

*Primary Examiner* — Syed O Hasan
(74) *Attorney, Agent, or Firm* — Mintz Levin Cohn Ferris Glovsky and Popeo, P.C.; Peter F. Corless

(57) ABSTRACT

A device for controlling a pressure of an oil pump in a vehicle is provided to. The device includes a sensor that detects an inclination of a vehicle and an oil pump that pumps oil in an oil pan to pressure transfer the oil to an engine of the vehicle. A controller determines an inclination value of the vehicle based on the information from the sensor and adjusts the operating mode of the oil pump to adjust the pressure of the oil supplied to the engine.

9 Claims, 5 Drawing Sheets

DEVICE FOR CONTROLLING PRESSURE OF OIL PUMP IN VEHICLE

CROSS-REFERENCE TO RELATED APPLICATION

This application claims under 35 U.S.C. § 119(a) the benefit of priority to Korean Patent Application No. 10-2019-0079373 filed on Jul. 2, 2019, the entire contents of which are incorporated herein by reference.

BACKGROUND

(a) Technical Field

The present disclosure relates to a device for controlling a pressure of an oil pump in a vehicle, and more particularly, to a device for controlling a pressure of an oil pump in a vehicle, which prevents a supply delay and a supply failure of engine oil and improves operation stability of various parts lubricated by the engine oil.

(b) Background Art

Generally, when a yawing behavior occurs in a vehicle under conditions of a left turn, a right turn, a sudden stop, and a sudden start, inclinations of the vehicle and an engine may occur. Further, as the inclinations of the vehicle and an engine occur, engine oil stored in an oil pan may be abruptly deflected in a specific direction.

As the engine oil is abruptly deflected to one side in the oil pan, a supply of the engine oil into an oil path becomes insufficient. Thus, an oil supply delay and failure to various bearings and various hydraulic mechanisms, which require an oil supply, and degradation of operation stability occur. Further, it is difficult to secure a minimum oil film thickness for lubrication of a piston in an engine cylinder and thus, piston noise occurs. In addition, as a temperature of the engine oil increases during a high-speed turning or a sudden behavior of the vehicle, performance degradation and engine noise occur due to a knocking and a retarding in ignition timing of an engine. Thus, a cooling jet operation is required through a supply of the engine oil at a pressure that is greater than an opening pressure of a piston cooling jet.

The above information disclosed in this section is merely for enhancement of understanding of the background of the disclosure and therefore it may contain information that does not form the prior art that is already known in this country to a person of ordinary skill in the art.

SUMMARY

The present disclosure provides a device for controlling a pressure of an oil pump in a vehicle, which is capable of increasing supply stability of engine oil by adjusting a pressure of the engine oil which is discharged from an oil pump based on an inclination of a vehicle and improving operation stability of various lubrication parts.

In an exemplary embodiment, a device for controlling a pressure of an oil pump in vehicle may include a sensor configured to detect an inclination of the vehicle; an oil pump configured to pump oil in an oil pan to pressure transfer the oil to an engine; and a controller configured to determine an inclination value of the vehicle based on information received from the sensor and adjust an operating mode of the oil pump to adjust a pressure of the oil supplied to the engine. The device for controlling a pressure of an oil pump has the following features.

When the inclination value of the vehicle is equal to or greater than a reference value, the controller may be configured to determine that the inclination of the oil in the oil pan is abnormal and perform upward control on the pressure of the oil discharged from the oil pump to have a target value, thereby increasing a flow rate of the oil supplied to the engine. In particular, the controller may be configured to perform the upward control on the pressure of the oil supplied to the engine in proportion to the inclination value of the vehicle. When a real-time pressure of the oil supplied to the engine is already equal to or greater than the target value, the controller may be configured to maintain the pressure of the oil supplied to the engine at the real-time pressure.

When the inclination value of the vehicle is less than the reference value, the controller may be configured to determine that the inclination of the oil in the oil pan is normal and adjust the pressure of the oil discharged from the oil pump based on a temperature and the pressure of the oil and a revolutions per minute of the engine, which are detected in real time.

The sensor may employ any one or two or more selected from among a yaw rate sensor, a steering angle sensor, an inclination sensor, and a gyro sensor. For example, the sensor may be the yaw rate sensor. When a yaw rate value of the vehicle detected using the yaw rate sensor is equal to or greater than a first reference value, the controller may be configured to perform upward control on the pressure of the oil to increase a flow rate of the oil supplied to the engine. For example, the sensor may be the steering angle sensor. When a steering angle value of the vehicle detected using the steering angle sensor is equal to or greater than a second reference value and a real-time speed of the vehicle is equal to or greater than a reference speed, the controller may be configured to perform upward control on the pressure of the oil to increase a flow rate of the oil supplied to the engine.

For example, the sensor may be the inclination sensor. When an irradiation angle value of a headlight of the vehicle detected using the inclination sensor is equal to or greater than a third reference value, the controller may be configured to perform upward control on the pressure of the oil to increase a flow rate of the oil supplied to the engine. For example, the sensor may be the gyro sensor. When an angular velocity value of the vehicle detected using the gyro sensor is equal to or greater than a fourth reference value, the controller may be configured to perform upward control on the pressure of the oil to increase a flow rate of the oil supplied to the engine.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
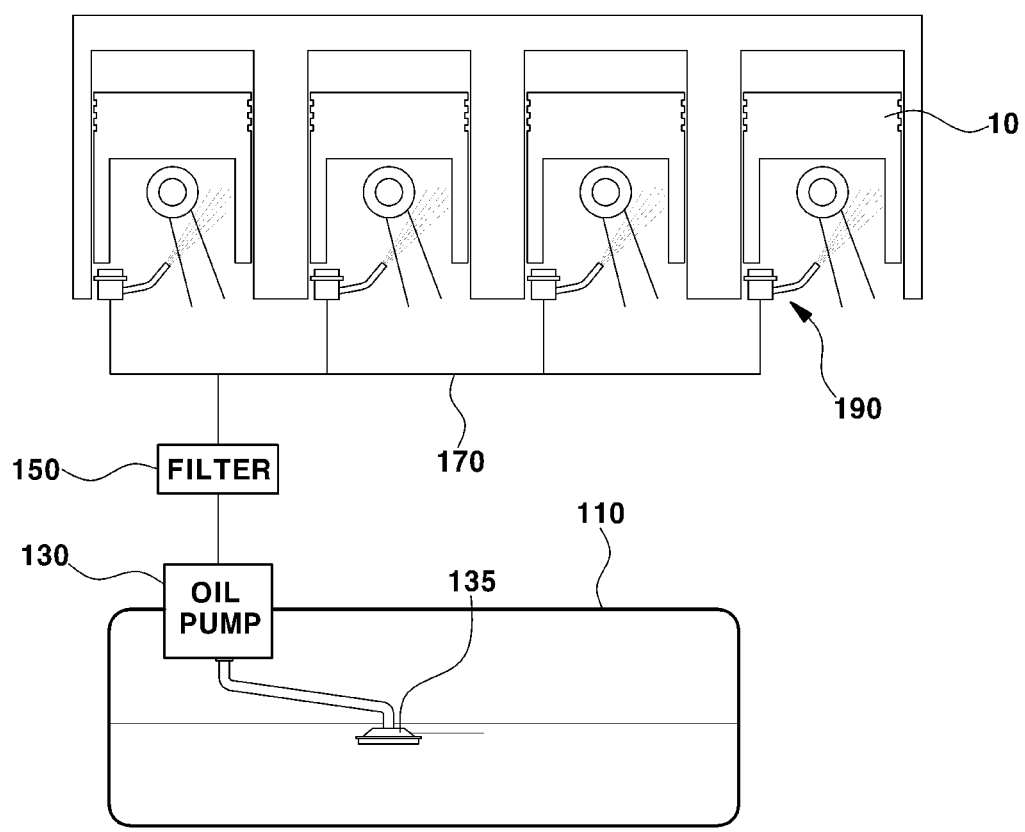
FIG. 1 is a diagram illustrating a supply path of engine oil according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

As shown in FIG. 1, an oil pump 130 of a vehicle may be configured to supply engine oil, which is stored in an oil pan 110, to an engine. The oil pan 110 may be attached to one side of a lower portion of the engine, and the oil pump 130 may be installed on one side of the oil pan 110. The oil pump 130 may be configured to suction the engine oil stored in the oil pan 110 through an oil strainer 135 connected to the oil pump 130 and pressure transfer the suctioned engine oil to the engine. The engine oil supplied to the engine may circulate through a process in which the engine oil is recovered to the oil pan 110 again.

To stably suction the engine oil, the oil strainer 135 is immersed in the engine oil stored in the oil pan 110. However, under a condition of a left turn, a right turn, a sudden stop, or a sudden start of the vehicle, inclinations of the vehicle and the engine occur and thus, the engine oil is abruptly deflected to one side of the oil pan 110. Further, the engine oil is deflected causing a supply of the engine oil to decrease or become insufficient.

According to the present disclosure, to solve a problem of a supply delay of the engine oil causing a lubrication problem when a supply of the engine oil and lubrication using the engine oil become disadvantageous due to a behavior of the vehicle while the vehicle is being driven, a device is provided for controlling a pressure of an oil pump, which is capable of adjusting a supply pressure of the engine oil based on an attitude of the vehicle.

Figure 2:
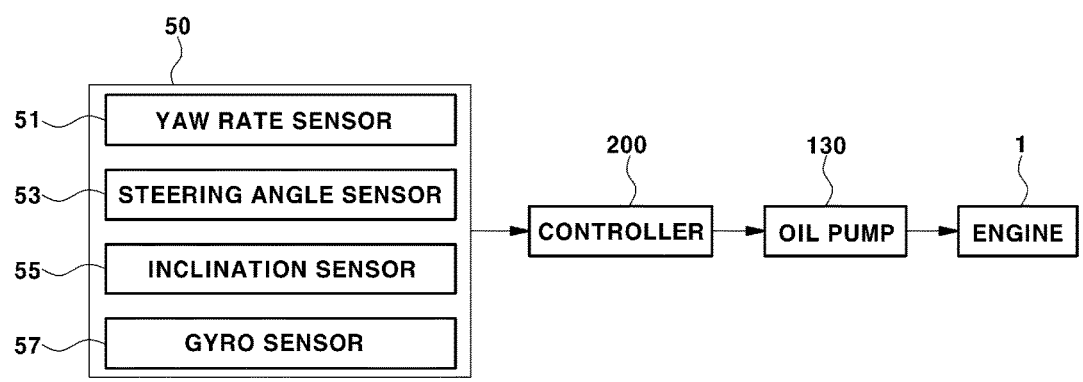
FIG. 2 is a diagram illustrating a device for controlling a pressure of an oil pump according to an exemplary embodiment of the present disclosure.

As shown in FIG. 2, the device for controlling a pressure of an oil pump may include a sensor 50 configured to detect a degree of an inclination of the vehicle while the vehicle is being driven, the oil pump 130 configured to supply oil for lubrication to the engine 1, and a controller 200 configured to adjust a pressure of the oil supplied to the engine 1 in response to a signal received from the sensor 50. Particularly, the controller 200 may be an engine controller mounted within the vehicle.

Further, the oil pump 130 may be configured to generate a pressure in the engine oil based on a target value determined by the controller 200 to pressure transfer the engine oil to the engine 1. In other words, the oil pump 130 may be operated by the controller 200 to generate a pressure in the engine oil which is pressure transferred to the engine 1. According to an operation of the oil pump 130, the pressure may be generated in the engine oil which is supplied to the engine 1. The oil pump 130 may thus include a separate configuration which applies a pressure to the engine oil introduced into the oil pump 130. Particularly, the pressure of the engine oil may refer to a pressure of the engine oil flowing in a main gallery 170 (see FIG. 1) of the engine 1. The engine oil discharged from the oil pump 130 may flow in the main gallery 170 via a filter 150.

Referring to FIG. 1, the main gallery 170 may be an oil path provided in a cylinder block of the engine 1. The engine oil may be pressure transferred to a cooling jet 190 by passing through the main gallery 170. The cooling jet 190 may be connected to the main gallery 170 in the form in which the engine oil is capable of flowing. The cooling jet 190 may be configured to inject the engine oil toward a piston 10 of the engine 1. The cooling jet 190 may be configured to discharge the engine oil due to the pressure of the engine oil in the main gallery 170. A check valve for adjusting a discharge pressure of an engine oil may be provided in a general cooling jet. However, a check valve is not provided in the cooling jet 190 according to the exemplary embodiment of the present disclosure.

When a sudden turn, sudden braking, or a sudden start of the vehicle occurs, an inclination and leaning of the vehicle may occur. Further, when the inclination and the leaning of the vehicle exceed a predetermined level, the engine oil in the oil pan 110 is abruptly deflected to one side of the oil pan 110. When the engine oil is deflected to one side of the oil pan 110, the oil strainer 135 may not be capable of normal suction of the engine oil. In other words, when a deflection of the engine oil occurs, it may be difficult for the oil pump 130 to suction the engine oil using the oil strainer 135.

As described above, the controller 200 may be configured to determine degrees of the inclination and the leaning of the vehicle based on a signal received from the sensor 50. In other words, the controller 200 may be configured to determine the degree of the inclination of the vehicle and a degree of the deflection of the engine oil in the oil pan 110 from the signal of the sensor 50. Therefore, the signal of the sensor 50 may be regarded as a signal that indicates the degree of the inclination of the vehicle (i.e., an inclination value) and the degree of the deflection of the engine oil (i.e., a deflection value).

The controller 200 may be configured to adjust the pressure of the engine oil discharged from the oil pump 130 in response to the signal of the sensor 50. Specifically, when the inclination value of the vehicle is equal to or greater than a reference value, the controller 200 may be configured to determine that the degree of the inclination of the vehicle and the degree of the deflection of the engine oil are abnormal. In other words, when the inclination value of the vehicle is equal to or greater than the reference value, the controller 200 may be configured to determine that the engine oil is further abnormally deflected to one side of the oil pan 110 according to the inclination of the vehicle. When the engine oil is determined as being deflected, the controller 200 may be configured to operate the oil pump 130 in a first operating mode (i.e., a high pressure mode).

The oil pump 130 may be operated in the first operating mode to increase the pressure of the engine oil and discharge the engine oil to the engine oil 1. In other words, the controller 200 may be configured to operate the oil pump 130 in the first operation mode to perform upward control on the pressure of the engine oil supplied to the engine to the target value. The upward control on the pressure may refer to increasing the pressure to the target value. The pressure of the engine oil may be upward controlled (e.g., increased) to the target value to thus increase a flow rate of the engine oil supplied to the engine 1. For example, the controller 200 may be configured to perform the upward control by increasing a discharge pressure of the engine oil to a predetermined reference pressure. Alternatively, the controller 200 may be configured to perform the upward control on the pressure of the engine oil to a target value in proportion to the inclination value of the vehicle. In particular, the target value may be varied according to the inclination value of the vehicle.

The sensor 50 may be selected from among a yaw rate sensor 51, a steering angle sensor 53, an inclination sensor 55, and a gyro sensor 57 which are installed within the vehicle. In other words, the inclination value of the vehicle may be calculated based on signal(s) detected from any one or two or more among the yaw rate sensor 51, the steering angle sensor 53, the inclination sensor 55, and the gyro sensor 57. For example, the sensor 50 may be the yaw rate sensor 51. When a yaw rate value (i.e., a yaw angular speed) of the vehicle, which is detected using the yaw rate sensor 51, is equal to or greater than a first reference value, the controller 200 may be configured to perform upward control on the pressure of the engine oil supplied to the engine 1.

The fact the yaw rate value is equal to or greater than the first reference value may indicate that the vehicle is inclined to an abnormal level (i.e., is excessively inclined). A value derived in advance through a preliminary test and evaluation may be applied as the first reference value. For example, when the yaw rate is about 3° or greater, the controller 200 may be configured to perform upward control to adjust the pressure of the engine oil discharged from the oil pump 130 to be 2.5 bar or greater. Alternatively, when the yaw rate is equal to or greater than about 3°, the controller 200 may be configured to perform upward control to adjust a discharged pressure of the engine oil to be a predetermined ratio to a real-time pressure at which the engine oil is currently discharged (see FIG. 3). The controller 200 may be configured to perform upward control on the pressure of the engine oil to increase a flow rate of the engine oil supplied to the engine 1.

Alternatively, the sensor 50 may be the steering angle sensor 53. When a steering angle value of a steering wheel of the vehicle, which is detected using the steering angle sensor 53, is equal to or greater than a second reference value, the controller 200 may be configured to perform upward control on the pressure of the engine oil (e.g., increase the pressure). The fact that the steering angle value of the steering wheel is equal to or greater than the second reference value indicates that the vehicle is inclined to an abnormal level due to a sudden steering change by a driver. When the steering angle value of the vehicle is equal to or greater than the second reference value and, simultaneously, the vehicle speed is equal to or greater than a set reference speed, the controller 200 may be configured to perform the upward control on the pressure of the engine oil.

In other words, when a speed of the vehicle is less than the set reference speed, even though the steering angle value is equal to or greater than the second reference value, the controller 200 may not perform the upward control on the engine oil. Particularly, when a speed of the vehicle is low, there is less concern that the engine oil in the oil pan 110 is deflected even when the vehicle performs a sudden turn. A value derived in advance through a preliminary test and evaluation may be applied as the second reference value.

Alternatively, the sensor 50 may be the inclination sensor 55. The inclination sensor 55 may be configured to detect an irradiation angle value of a headlight of the vehicle, which illuminates a front direction of the vehicle. When the irradiation angle value of the headlight detected using the inclination sensor 55 is equal to or greater than a third reference value, the controller 200 may be configured to perform upward control on the pressure of the engine oil to increase a flow rate of the engine oil supplied to the engine 1. The fact the irradiation angle value of the headlight is equal to or greater than the third reference value may indicate a state in which the vehicle enters an inclined road to be excessively inclined. The third reference value may be a value which is preset by a designer.

Alternatively, the sensor 50 may be the gyro sensor 57. The gyro sensor 57 may be configured to detect an angular velocity of the vehicle. When the angular velocity is integrated, an inclination angle of the vehicle may be calculated. Thus, when an angular velocity value detected by the gyro sensor 57 is equal to or greater than a fourth reference value, the controller 200 may be configured to perform upward control on a real-time pressure of the engine oil. The fact that the angular velocity value of the vehicle is equal to or greater than the fourth reference value refers to that the vehicle is excessively inclined due to an abrupt variation in behavior of the vehicle. The fourth reference value may be a value which is preset by a designer.

Unlike the above-described exemplary embodiments, the controller 200 may be configured to determine the inclination value of the vehicle based on information obtained from two or more sensors among the yaw rate sensor 51, the steering angle sensor 53, the inclination sensor 55, and the gyro sensor 57. Specifically, when each of pieces of information obtained from two or more sensors is equal to or greater than a reference value, the controller 200 may be configured to determine that the vehicle is excessively inclined. When each of the pieces of information detected by the two or more sensors is equal to or greater than the reference value, the controller 200 may be configured to determine that the engine oil in the oil pan 110 is abnormally deflected to one side of the oil pan 110.

Figure 3:
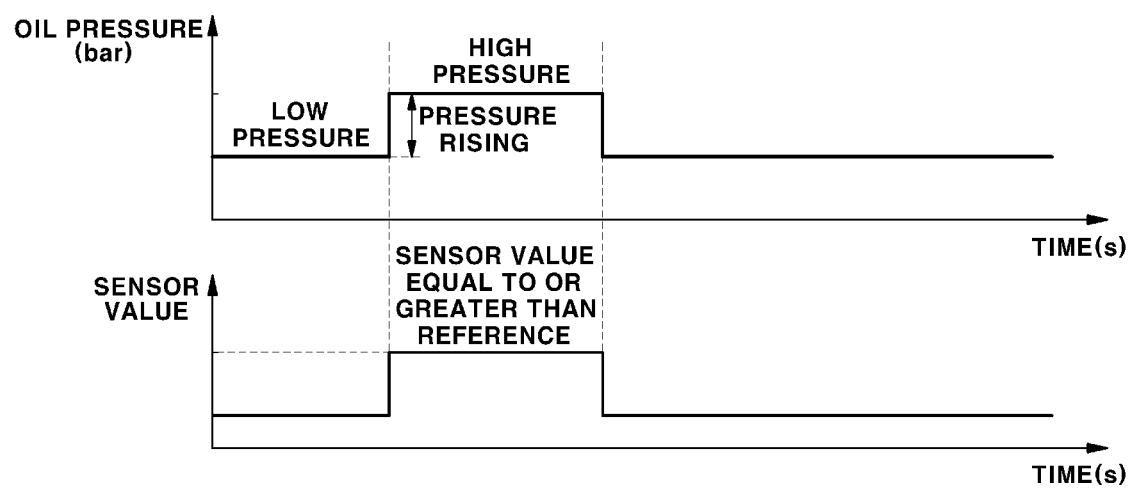
FIGS. 3 and 4 are conceptual diagrams illustrating a method of controlling an oil pressure according to an exemplary embodiment of the present disclosure.

When the engine oil is determined as being excessively deflected to one side of the oil pan 110, the controller 200 may be configured to perform upward control on a pressure of the engine oil discharged from the oil pump 130 (see FIG. 3). The controller 200 may be configured to adjust an operating mode of the oil pump 130 based on a degree of a deflection of the engine oil to adjust a degree of pumping of the engine oil in the oil pump 130. Consequently, the controller 200 may be configured to adjust a discharge pressure of the engine oil supplied to the engine 1. When the discharge pressure of the engine oil is upward controlled (e.g., increased), a flow rate of the engine oil supplied from the oil pump 130 to the engine 1 may be increased.

The controller 200 may be configured to operate the oil pump 130 in one mode of a first operating mode and a second operating mode according to the degree of the deflection of the engine oil and the degree of the inclination of the vehicle. In the first operating mode, a target value of the pressure of the engine oil discharged from the oil pump 130 may be determined based on the information detected by the sensor 50. In other words, in the first operating mode, the target value of the pressure of the engine oil may be controlled based on an inclination value of the vehicle. When the first operating mode is executed, the oil pump 130 may be configured to generate a pressure of the engine oil discharged to the engine 1 by converging on the target value which is determined according to the inclination value of the vehicle.

When the inclination value of the vehicle is equal to or greater than the reference value, to perform upward control on the pressure of the engine oil, the controller 200 may be configured to operate the oil pump 130 in the first operating mode. Further, when the inclination value of the vehicle is less than the reference value, the controller 200 may be configured to maintain the oil pump 130 in the second operating mode. In other words, when the inclination value of the vehicle is less than the reference value, the controller 200 may be configured to determine that the degree of the inclination of the vehicle is normal to operate the oil pump 130 in the second operating mode.

The second operating mode may be an operating mode in which the pressure of the engine oil discharged from the oil pump 130 is adjusted using an oil pressure control map which is stored in advance in the controller 200. In other words, when the oil pump 130 is operated in the second operating mode, the controller 200 may be configured to adjust a pressure value of the engine oil using the oil pressure control map. For example, the oil pressure control map may be used to determine the pressure of the engine oil, which is generated by the oil pump 130, based on an engine revolutions per minute, a temperature of the engine oil, the pressure of the engine oil, and the like which are detected in real time.

Figure 4:
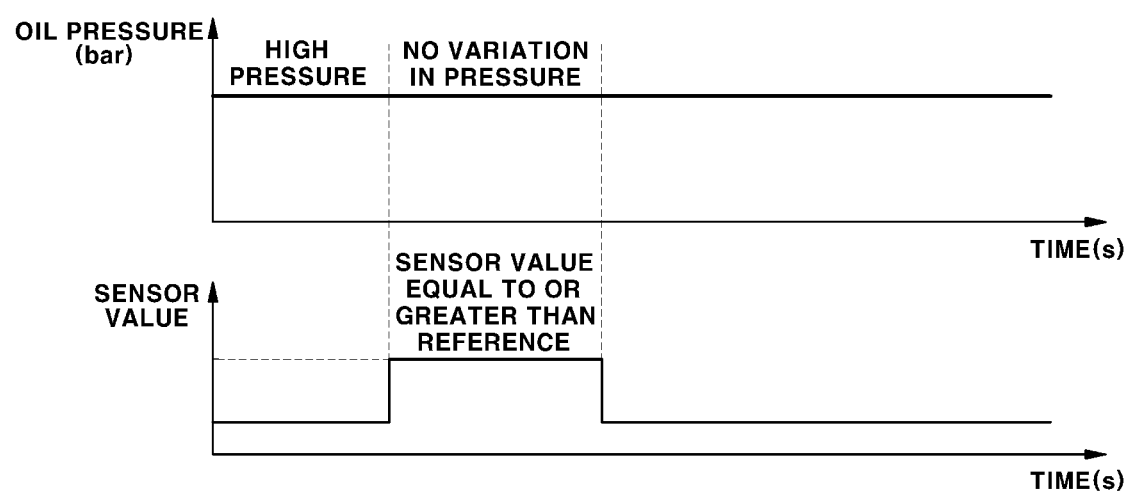

When a real-time operating mode of the oil pump 130 is the first operating mode and the inclination value of the vehicle is reduced to be less than the reference value and then restored, the controller 200 may be configured to operate the oil pump 130 in the second operating mode. Further, when the real-time operating mode of the oil pump 130 is the second operating mode and the inclination value of the vehicle is increased to be equal to or greater than the reference value, the controller 200 may be configured to operate the oil pump 130 in the second operating mode. In particular, when a current pressure value of the engine oil (i.e., a real-time pressure value of the engine oil) is equal to or greater than a target value of the pressure of the engine oil (i.e., a target pressure value), which is determined according to the first operating mode, the controller 200 may not operate the oil pump 130 in the first operating mode (see FIG. 4).

In other words, when the oil pump 130 is determined as being operated in the first operating mode, when the pressure of the engine oil is equal to or greater than the target pressure value determined by the first operating mode, the controller 200 may be configured to maintain the oil pump 130 in the second operating mode. When the real-time pressure of the engine oil, which is supplied to the engine 1 by the oil pump 130, is already equal to or greater than the target pressure value which will be achieved by the first operating mode, the controller 200 may be configured to maintain the oil pump 130 in the second operating mode to maintain the real-time pressure of the engine oil. This is because the oil pump 130 is operated in the second operating mode, but the current pressure of the engine oil is equal to or greater than the target value such that there is no need to perform upward control on the pressure of the engine oil.

Figure 5:
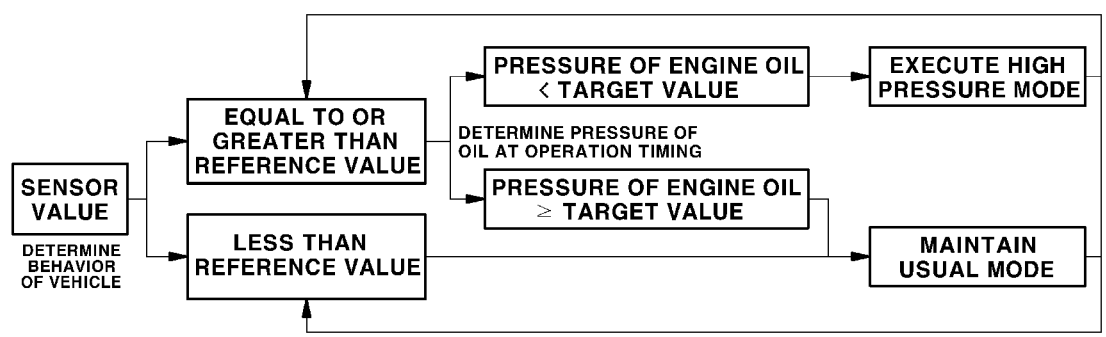
FIG. 5 is a diagram illustrating a method of controlling a pressure of an oil pump according to an exemplary embodiment of the present disclosure.

FIG. 5 is a diagram illustrating a method of controlling a pressure of an oil pump according to an exemplary embodiment of the present disclosure. Referring to FIG. 5, the controller 200 may be configured to determine a behavior of the vehicle by analyzing the information acquired by the sensor 50. The controller 200 may be configured to determine whether a possibility of an abnormal inclination of the vehicle or an abnormal deflection of the engine oil in the oil pan 110 occurs based on the information of the sensor 50. Specifically, the controller 200 may be configured to determine whether a deflection of the engine oil in the oil pan 110 is abnormal by comparing a reference value with the information acquired through the sensor 50.

When the information acquired by the sensor 50 is equal to or greater than the reference value, the controller 200 may be configured to determine whether a current pressure value of the engine oil is less than a target value by comparing the current pressure value with the target value. When the current pressure value of the engine oil is less than the target value, the controller 200 may be configured to operate the oil pump 130 in the first operating mode (i.e., the high pressure mode). In other words, when the real-time pressure value of the engine oil is less than the target value, the controller 200 may be configured to perform upward control on the pressure of the engine oil discharged from the oil pump 130 to have the target value. When the current pressure value of the engine oil is equal to or greater than the target value, the controller 200 may be configured to operate the oil pump 130 in the second operating mode (i.e., a usual mode).

In other words, when the real-time pressure value of the engine oil is equal to or greater than the target value, the controller 200 may not perform upward control on the pressure of the engine oil discharged from the oil pump 130. This is because the fact that the real-time pressure value of the engine oil is equal to or greater than the target value indicates that the pressure value of the engine oil already reaches the target value. Further, when the information acquired by the sensor 50 is less than the reference value, the controller 200 may be configured to maintain the oil pump 130 in the second operating mode or operate the oil pump 130 in the second operating mode.

As described above, when the degree of the inclination of the vehicle is excessive and thus the engine oil in the oil pan is abnormally deflected, the device of controlling a pressure of an oil pump according to the present disclosure may perform upward control on the discharged pressure of the engine oil to increase a flow rate of the engine oil supplied to the engine 1. Consequently, the engine oil may be supplied to the engine 1 at a normal flow rate which is desired by the user. As the engine oil is supplied to the engine 1 at the normal flow rate, operation stability of lubrication parts such as a piston, a crankshaft, a bearing, and the like which require an oil supply for lubrication may be improved, and lubrication performance and cooling performance of the piston may be improved such that durability and a combustion efficiency of the engine 1 may be increased.

In accordance with the device for controlling a pressure of an oil pump, which is configured as described above, a pressure of an engine oil discharged from an oil pump may be adjusted based on a degree of an inclination of a vehicle, and, when the inclination of the vehicle is abnormal, the pressure of the engine oil may be upward control to increase supply stability of the engine oil. Accordingly, a supply delay and a supply failure of the engine oil may be prevented and operation stability of various lubrication parts may be improved.

Although the exemplary embodiments of the present disclosure have been described in detail, the scope of the prevent disclosure is not limited to these exemplary embodiments, and various modifications and improvements devised by those skilled in the art using the fundamental concept of the present disclosure, which is defined by the appended claims, further fall within the scope of the present disclosure.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A device for controlling a pressure of an oil pump in a vehicle, comprising:
a sensor configured to detect an inclination of the vehicle;
an oil pump configured to pump oil in an oil pan to pressure transfer the oil to an engine of the vehicle; and
a controller configured to determine an inclination value of the vehicle based on information received from the sensor and adjust an operating mode of the oil pump to adjust a pressure of the oil supplied to a cylinder block of the engine,
wherein, when the inclination value of the vehicle is less than the reference value, the controller is configured to determine that the inclination of the oil in the oil pan is normal and adjust the pressure of the oil discharged from the oil pump based on a temperature and the pressure of the oil and a revolutions per minute of the engine, detected in real time.

2. The device of claim 1, wherein, when the inclination value of the vehicle is equal to or greater than a reference value, the controller is configured to determine that the inclination of the oil in the oil pan is abnormal and increase the pressure of the oil discharged from the oil pump to a target value, thereby increasing a flow rate of the oil supplied to the engine.

3. The device of claim 2, wherein the controller is configured to increase the pressure of the oil supplied to the engine in proportion to the inclination value of the vehicle.

4. The device of claim 2, wherein, when a real-time pressure of the oil supplied to the engine is already equal to or greater than the target value, the controller is configured to maintain the pressure of the oil supplied to the engine at the real-time pressure.

5. The device of claim 1, wherein the sensor is any one or two or more selected from among a yaw rate sensor, a steering angle sensor, an inclination sensor, and a gyro sensor.

6. The device of claim 5, wherein, when the sensor is the yaw rate sensor and a yaw rate value of the vehicle detected using the yaw rate sensor is equal to or greater than a first reference value, the controller is configured to increase the pressure of the oil to increase a flow rate of the oil supplied to the engine.

7. The device of claim 5, wherein, when the sensor is the steering angle sensor, a steering angle value of the vehicle detected using the steering angle sensor is equal to or greater than a second reference value, and a real-time speed of the vehicle is equal to or greater than a reference speed, the controller is configured to increase the pressure of the oil to increase a flow rate of the oil supplied to the engine.

8. The device of claim 5, wherein, when the sensor is the inclination sensor and an irradiation angle value of a headlight of the vehicle detected using the inclination sensor is equal to or greater than a third reference value, the controller is configured to increase the pressure of the oil to increase a flow rate of the oil supplied to the engine.

9. The device of claim 5, wherein, when the sensor is the gyro sensor and an angular velocity value of the vehicle detected using the gyro sensor is equal to or greater than a fourth reference value, the controller is configured to increase the pressure of the oil to increase a flow rate of the oil supplied to the engine.

* * * * *